W. A. RUSH.
BEET TOPPING MACHINE.
APPLICATION FILED JAN. 8, 1917.
1,235,843.
Patented Aug. 7, 1917.
2 SHEETS—SHEET 1.
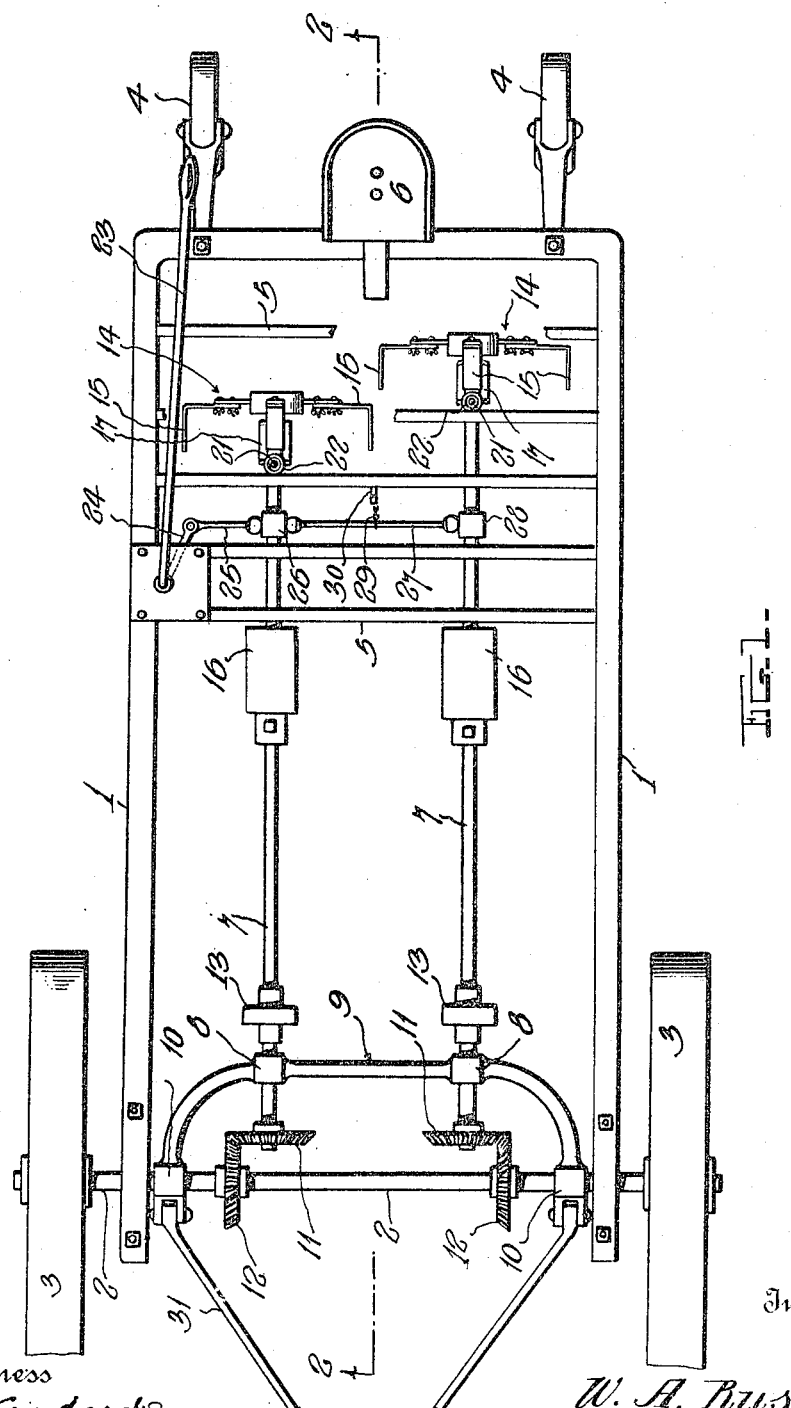
Witness
H. Woodard
Inventor
W. A. Rush
By H. B. Willson & Co.
Attorneys

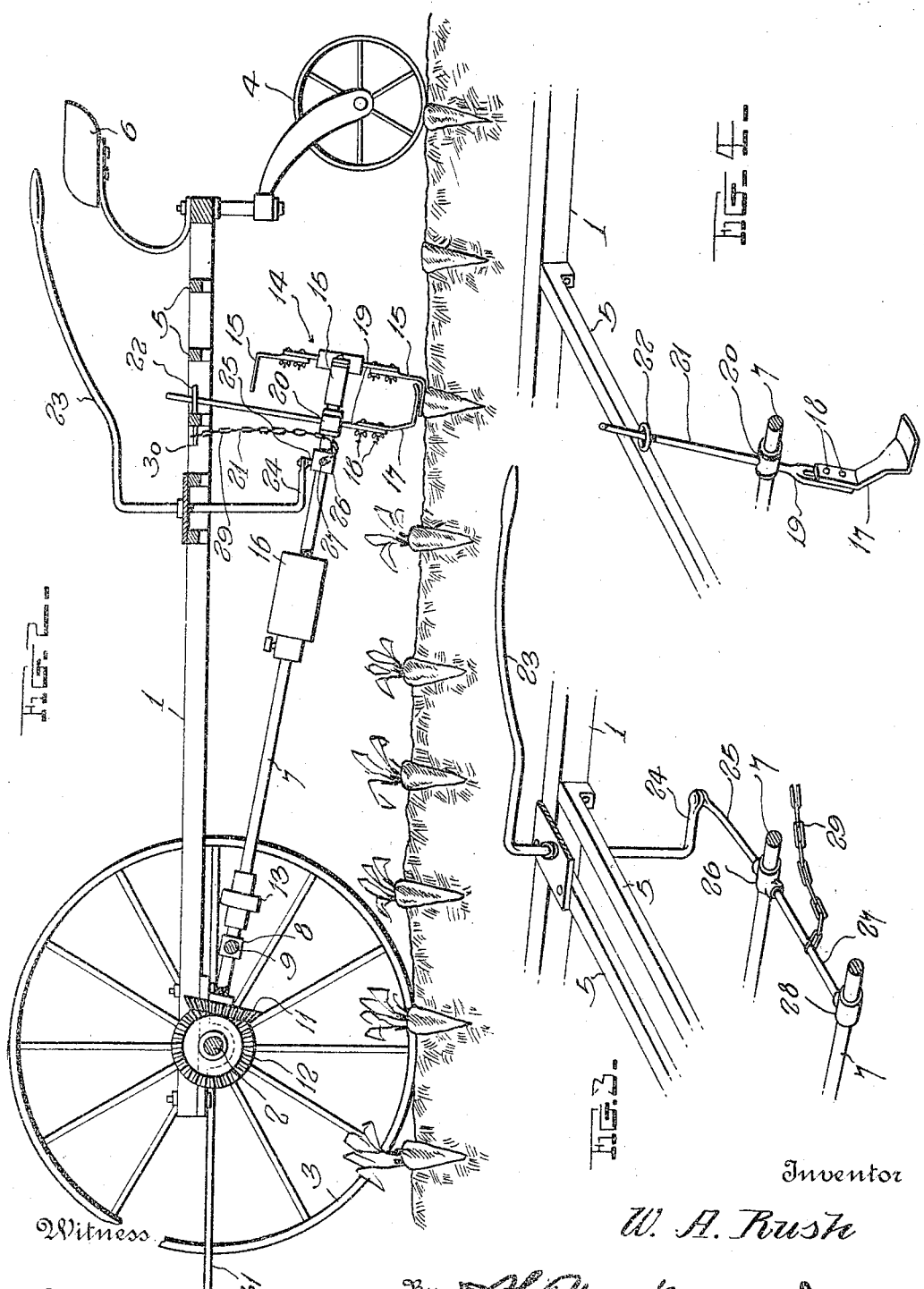

UNITED STATES PATENT OFFICE.

WEAVER A. RUSH, OF LOGAN, UTAH.

BEET-TOPPING MACHINE.

1,235,843.

Specification of Letters Patent. Patented Aug. 7, 1917.

Application filed January 8, 1917. Serial No. 141,235.

*To all whom it may concern:*

Be it known that I, WEAVER A. RUSH, a citizen of the United States, residing at Logan, in the county of Cache and State of Utah, have invented certain new and useful Improvements in Beet-Topping Machines; and I do declare the following to be a full, clear, and exact description of the invention, such as will enable others skilled in the art to which it appertains to make and use the same.

My invention has for its object to provide a comparatively simple and inexpensive, yet highly efficient and durable machine for topping beets at a uniform distance below the upper end of the beet proper, regardless of the amount which may project from the earth, and with this general object in view, the invention resides in certain novel features of construction and unique combinations of parts to be hereinafter fully described and claimed, the descriptive matter being supplemented by the accompanying drawings which constitute a part of this application and in which:

Figure 1 is a top plan view of the improved machine;

Fig. 2 is a longitudinal section thereof on the plane of the line 2—2 of Fig. 1;

Fig. 3 is a perspective detail showing more particularly the manner in which the cutters are adjusted laterally by hand;

Fig. 4 is a similar view showing more particularly the means for holding the earth engaging shoes against rotation with the shafts.

In the drawings above briefly described, the numeral 1 has reference to a suitably constructed frame supported at its front end by an axle 2 which is driven by a pair of wheels 3 while a pair of caster wheels 4 support the rear end of the frame. A platform is provided on the rear end of the frame 1 and is by preference constructed of a plurality of transverse rods 5, a driver's seat 6 being disposed adjacent the rear edge of said platform.

Longitudinally disposed shafts 7 are rotatably mounted at their front ends in bearings 8 carried by the cross bar of a yoke 9 whose ends are equipped with bearings 10 which rotatably receive the axle 2, said front ends of the shafts 7 having bevel gears 11 meshing with similar gears 12 on said axle, whereby rotation of the latter will drive the shafts. Suitable universal joints 13 are provided for the shafts 7 in rear of the bearings 8 so that the rear portions of said shafts may swing both vertically and horizontally. The rear ends of the shafts 7 carry rotary cutters 14 including detachable beet topping knives 15 while the intermediate portions of said shafts are provided with weights 16 adjustable longitudinally thereof so that the cutters 14 may be held down with more or less force.

Shoes 17 are provided to travel on the earth to move the cutters 14 vertically so as to only cut off a predetermined amount of the beet with the top even though the soil may be very uneven and the beets may project unequal distances above the surface. The shoes in question are detachably secured by bolts or the like 18 to rigid arms 19 which depend from and are formed integrally with bearings 20 mounted on the rear end portions of the shafts 7. Other rigid arms 21 rise from the bearings 20 and are received for both sliding and pivotal movement in eyes 22 carried by certain of the rods 5 or by other suitable parts of the frame 1. This arrangement prevents the shoes 17 from rotating with the shafts yet permits the latter to move vertically and laterally as required, the vertical movement being automatically controlled by said shoes whereas the horizontal movement is imparted to the shafts by means of a hand lever 23 adjacent the driver's seat 6, the lower end of said lever having a crank arm 24 connected by a link 25 with a bearing 26 mounted on one of the shafts 7, a link 27 being provided for connecting this bearing with another 28 mounted on the other shaft. It is obvious that any number of shafts may be connected in this manner for movement from the single lever 23.

A chain or the like 29 preferably is connected at one end with the link 27 for raising the shafts 7 so as to dispose the cutters free above the earth when required, said chain coöperating with a pin 30 projecting from one of the rods 5 as will be clear from Fig. 2.

Although two shafts 7 and rotary cutters thereon have been shown, it is obvious that the machine may be constructed with any number of shafts and cutters according to demand and it may thus be made to top any required number of rows at a single trip across the field. In operation, the machine is drawn forwardly by any preferred means so that the wheels 3 drive the bevel gears 12, the latter in turn imparting rotary motion to the shafts 7 through the instrumentality of the gears 11. The shoes 17 now rest on the ground and move the shafts vertically as required so as to permit proper topping of the beets by the cutters 14, said shafts being shifted horizontally when necessary by means of the lever 23. In order that the shoes 17 may assume the same relation in respect to the earth and the cutters regardless of the amount to which the shafts swing laterally, said shoes are preferably dished in transverse section as shown in Fig. 4.

As above stated, any preferred means may be employed for drawing the machine, but horses are preferably hitched to a doubletree not shown which is connected with a yoke 31 whose rear ends are pivoted to the bearings 10 as shown clearly in Fig. 1.

By constructing the improved machine in the manner shown and described, it will not only be comparatively simple and inexpensive, but will be highly efficient and durable. For these reasons, the construction shown constitutes the preferred form of the machine but it is to be understood that within the scope of the invention as claimed, numerous changes may be made without sacrificing the principal advantages.

I claim:

1. A beet topping machine comprising a portable frame, a substantially horizontal longitudinally disposed shaft carried thereby and movable vertically and horizontally, a rotary beet topping knife carried by said shaft, a bearing mounted on said shaft, an earth engaging shoe carried by said bearing to control the relation of the knife with the beets, and means for swinging said shaft horizontally.

2. A beet topping machine comprising a portable frame, a substantially horizontal longitudinally disposed shaft carried thereby and movable vertically, a rotary cutter carried by said shaft, a weight mounted on and adjustable longitudinally of said shaft, and an earth engaging shoe for controlling the relation of the cutter with the beets.

3. A beet topping machine comprising a portable frame, a substantially horizontally longitudinally disposed shaft carried thereby and movable vertically, a rotary cutter carried by said shaft, a bearing mounted on said shaft, an arm secured rigidly to and rising from said bearing, a guide receiving said arm slidably, and an earth engaging shoe secured to said bearing for controlling the relation of the cutter with the beets.

4. A beet topping machine comprising a portable frame, a substantially horizontal longitudinally disposed shaft carried thereby and moving vertically and horizontally, manually operated means for swinging said shaft horizontally, a rotary cutter mounted on said shaft, a non-rotatable bearing also mounted thereon, a vertical arm rigidly secured to and rising from said bearing, a guide carried by the frame and receiving said arm for sliding and pivotal movement, and an earth engaging shoe secured rigidly to and depending from said bearing for controlling the relation of the cutter with the beets.

5. A beet topping machine comprising a portable frame, a longitudinally disposed shaft carried thereby and movable horizontally, a rotary cutter carried by said shaft, manually operated means for swinging said shaft horizontally, a bearing mounted on said shaft, an arm secured to and rising rigidly from said bearing, a guide on the frame receiving said arm, and an earth engaging shoe secured to and depending from said bearing for controlling the relation of the cutter with the beets, the earth engaging portion of said shoe being curved in transverse section to assume the same relation in respect to the earth and the cutter, regardless of the amount to which the shaft is swung horizontally.

In testimony whereof I have hereunto set my hand in the presence of two subscribing witnesses.

WEAVER A. RUSH.

Witnesses:
A. A. LAW,
H. CAMPBELL.

Copies of this patent may be obtained for five cents each, by addressing the "Commissioner of Patents, Washington, D. C."